United States Patent
Sharma

[19]

[11] Patent Number: 6,088,095
[45] Date of Patent: Jul. 11, 2000

[54] MODEL-BASED SPECTRAL CALIBRATION OF COLOR SCANNERS

[75] Inventor: Gaurav Sharma, Webster, N.Y.

[73] Assignee: Xerox Corporation, Stamford, Conn.

[21] Appl. No.: 09/190,775

[22] Filed: Nov. 12, 1998

[51] Int. Cl.[7] .................................. G01J 1/02; H04N 1/46
[52] U.S. Cl. .................. 356/243.5; 356/402; 356/243.1; 358/500; 358/504; 358/515; 358/518
[58] Field of Search .............................. 356/243.1, 243.5, 356/402, 392, 404; 358/500, 504, 523, 515, 518, 298

[56] References Cited

U.S. PATENT DOCUMENTS

| | | | |
|---|---|---|---|
| 5,148,288 | 9/1992 | Hannah | 356/404 |
| 5,157,506 | 10/1992 | Hannah | 356/404 |
| 5,272,518 | 12/1993 | Vincent | 356/405 |
| 5,463,480 | 10/1995 | MacDonald et al. | 358/515 |
| 5,809,213 | 9/1998 | Bhattacharjya | 358/504 |
| 5,835,244 | 11/1998 | Bestmann | 358/515 |
| 5,956,469 | 9/1999 | Liu et al. | 358/504 |
| 6,005,968 | 12/1999 | Granger | 358/504 |

OTHER PUBLICATIONS

Combettes, Patrick L., *Generalized Convex Set Theoretic Image Recovery*, Dept. of Electrical Engineering—City College and Graduate School; City University of New York, New York, NY 10031.

Sharma, Gaurav, Trussell, H. Joel, *Set Theoretic Estimation in Color Scanner Characterization*, Journal of Electronic Imaging/Oct. 1996/Vo. 5(4)/479.

Viggiano, J.A. Stephen, Wang, C. Jeffrey, *A Novel Method for Colorimetric Calibration of Color Digitizing Scanners*, RIT Research Corporation, Imaging Division.

Berns, Roy S., Shyu, M.J., *Colorimetric Characterization of a Desktop Drum Scanner Using a Spectral Model*, Journal of Electronic Imaging 4(4), 360–372 (Oct. 1995).

*Primary Examiner*—Frank G. Font
*Assistant Examiner*—Roy M. Punnoose
*Attorney, Agent, or Firm*—Fay, Sharpe, Fagan, Minnich & Mckee, LLP

[57] ABSTRACT

A target-less calibration system for calibrating a scanner for a particular input medium without using a dedicated calibration target on that medium is disclosed. The system employs the (predetermined) spectral response of the scanner and representative spectral measurements of the input medium to achieve the calibration. The representative spectral measurements of the input medium are used to infer the set of feasible spectra for the medium. Corresponding to a given scanner signal output, another set representing the candidate spectra that could have resulted in the given scanner output are determined using the predetermined scanner spectral response. Combining the two requirements, a spectrum in the intersection of the thus determined sets of scanner candidate spectra and prenoted feasible media spectra provides an estimated spectrum of the input sample. Repeating the process over the range of scanner outputs provides a complete spectral calibration for the scanner for the given medium. Each spectrum is convertible to a device-independent color space for any given viewing illuminant, providing a calibration from the scanner output to device independent color space.

21 Claims, 4 Drawing Sheets

6,088,095

MODEL-BASED SPECTRAL CALIBRATION OF COLOR SCANNERS

BACKGROUND OF THE INVENTION

This invention pertains to the art of imaging devices and systems, and more particularly digital color imaging devices. The invention is especially applicable as a color calibration technique for a scanning device and a media item being scanned by the device, without having to refer to a dedicated target representative of the media. By media, it is meant the combination of materials used in producing the image, such as in photography, the dyes being used, or in xerography, the different toners.

In particular, the invention comprises a method for targetless color calibration of a color scanner using one model for the scanner's operation and another model for the scanned media. The scanner model computes the scanner signals produced when scanning a given input sample by using the spectrum of the input sample and the predetermined spectral sensitivities for the scanner. The spectral model for the scanned media is derived from representative spectrophotometric measurements (usually from the image/images being scanned). In one embodiment of the invention, a calibration is obtained for a particular scanned color sample, by means of a globally convergent algorithm that uses the scanner signals for the sample along with the two models to obtain the spectral reflectance or transmittance of the scanned color sample. In another embodiment, the globally convergent algorithm is used to generate a look-up table (LUT) which relates scanner signals to input spectrum or to device independent color values obtainable from the spectrum, e.g. conversion of the scanned R,G,B into L*,a*,b*. In yet another embodiment, the LUT is generated by interpolation/extrapolation of correspondences between scanner signals and input spectrum (or device independent color values) obtained by using the scanner model to obtain scanner signals for a number of different candidate spectra generated using the media model. It will be appreciated to those skilled in the art that the invention could be readily adapted for use in other environments as, for example, where similar calibration objectives are required between devices normally requiring a dedicated target for successful implementation of the calibration, e.g. digital color cameras.

Consistent measurement, storage, electronic imaging and printing of a color for production workflow—from scanner, to screen, to proofer, to offset press—is a common problem for which a variety of color management systems have been created. Different devices all display or detect color in a different way, and more importantly, different from the way the human eye sees color. A common illustration of this inconsistency can be observed in any consumer electronics store where hardly any two on a wall of televisions showing the same program appear identical. With particular regard to document imaging systems, the way a scanning device sees color is different from the way the human eye will see color and in order to obtain a consistency between the two, there must be a conversion between the measured image signal generated by the scanner to the printed or displayed representation thereof so that it will appear consistent to the human eye. Thus, the conversion of device-dependent color, i.e., color that is sensed by a scanner or other color image capture apparatus, to device independent color, i.e., color that is perceived by the human eye and can be measured by a calorimeter, comprises generating a look-up table (LUT) that references differences between a specific device's method of representing or detecting a set of colors, and an absolute, independent model of color.

Representing the physical properties of how a particular image is displayed, printed or scanned is called modeling. In the context of the current invention, a spectral response model for a color scanner relates the reflectance/transmittance spectrum of a given color sample to the signals produced by the scanner when the given sample is scanned; and a model for a given medium represents the set of reflectance/transmittance spectra that can be realized in the given medium.

For accurate calibration of a color scanner, there must be some predetermined knowledge of the medium being scanned. Prior art systems calibrate by taking a target, an industry standard medium having several hundred color and tonal values, and measuring these values in a measuring stage. The target is scanned in by the scanner and a mapping is performed to give a conversion of the signal detected by the scanner for a particular location on the target to the corresponding measured color space values. A particular transformation, or LUT, that results will provide an accurate calibration of the scanner.

A particular problem addressed by the subject invention is the difficulty in maintaining an accurate calibration of different devices throughout a production workflow when a media target representative of the scanned samples is not available.

The present invention contemplates a new and improved target-less calibration technique which overcomes this problem and others to provide a spectral-based calibration of a color scanner based upon a model of the medium materials being scanned and the predetermined spectral response of the scanner. Given the scanner responses to a color sample on a given medium, the spectral reflectance/transmittance of the given color sample must lie within a) the set of spectra producible on the medium and b) the set of spectra that can result in the given scanner signals. A method of projections onto convex sets is therefore used in the preferred embodiment of the invention to identify a reflectance/transmittance spectrum that lies within both these sets, which serves as an estimate of the spectral reflectance/transmittance of the given sample. In an alternate embodiment of the invention, the media model is used to generate a set of candidate spectra for which scanner signals are generated by using the scanner model. Interpolation and/or extrapolation is then used to obtain the look-up table (LUT) from scanner signals to media spectrum (or alternately a device independent color space derived from the spectrum).

A BRIEF SUMMARY OF THE INVENTION

In accordance with the present invention, a method and system are provided to calibrate a color scanner using one model for the scanner's operation and another model for the media being scanned thereby. The scanner model is obtained by determining the spectral response of the scanner comprising a relationship between a spectrum of inputs to the scanner and scanner measurements generated in response to the inputs. The media model is obtained by measuring the selected media in a spectrophotometer for acquiring a set of spectra representative of the spectral nature of the medium. A set of medium spectra producible on the selected media can be determined from the representative set of spectra.

In one embodiment of the invention, a set of spectra that result in given scanner signals is determined based on the spectral response of the scanner. The spectrum of a particular input sample of the media is estimated from the scanner measurements by computing a spectrum in the intersection of the set of producible media spectra and the set of spectra that could give rise to the scanner measurements. The estimated spectrum is convertible to a device-independent color space. Accordingly, the scanner can be calibrated to the particular media, without having to resort to a predetermined calibration target. By repeating the process over a suitable range of scanner signals a LUT may be derived for transformation from scanner signals to spectrum or to colors in a device independent color space.

In an alternate embodiment of the invention, the scanner model is used to obtain scanner signals corresponding to several spectra in the set of media spectra and interpolation/extrapolation is utilized to obtain a complete LUT from scanner signals to input spectrum (or colors in a device independent color space).

In accordance with another aspect of the present invention, the spectral response of the scanner can be determined by either scanning reflective media or transmissive media. The determining of the set of spectra producible on the media comprises performing principal components analysis of spectral densities relative to an unprinted media, computed from the representative set of spectra.

In accordance with another aspect of the present invention, determining the set of media spectra and the set of scanner spectra comprises representing the sets as closed convex sets. The estimating thus comprises computing a spectrum in the intersection of the respective sets with an algorithm for projections onto convex sets.

In accordance with the present invention, a system and apparatus is provided including processing elements for color calibrating of a color scanner by using one model for the scanners operation and another model for the media type being scanned. The particular form of the media model is selected so that it may be used in conjunction with the scanner model to allow an application of a globally convergent generalized POCS (Projection Onto Convex Sets) algorithm for scanner calibration. The system enables the ability to obtain spectral photometric data of a document from the scanner and to perform target-less scanner calibration. More specifically, the invention provides an improved LUT for conversion of a scanned RGB space into L*,a*,b* space, without the use of a calibration target.

One benefit obtained by use of the present invention is a calibration method and apparatus which facilitates calibration between a wide variety of different scanning devices and different media when calibration targets are unavailable.

Another benefit obtained from the subject invention is a calibration technique which can estimate acceptable calibration transformation from scanning either reflective media or transmissive media.

Yet another benefit of the subject invention is scanner calibration by mere computation of a globally convergent algorithm utilizing a predetermined particular form of media model in conjunction with obtained spectral photometric data from a scan of the particular media involved.

Yet another benefit of the subject invention is a calibration scheme which is spectral in nature; so calorimetric data can be obtained under any number of viewing illuminants.

Yet another advantage of the subject invention is for any given media type, the calibration can be generated without involving the actual scanning device at all if the spectral responses are available and representative spectral measurements are available from the medium.

Yet another advantage is that the calibrating look-up table can be estimated by alternative techniques including employing a projection algorithm for convex sets or by an interpolation/extrapolation computation.

Other benefits and advantages for the subject new targetless calibration method and apparatus will become apparent to those skilled in the art upon the reading and understanding of this specification.

BRIEF DESCRIPTION OF THE DRAWINGS

The invention may take physical form in certain parts and steps and arrangements of parts and steps, the preferred embodiments of which will be described in detail in the specification and illustrated in the accompanying drawings and wherein.

DETAILED DESCRIPTION OF THE INVENTION

Figure 3:
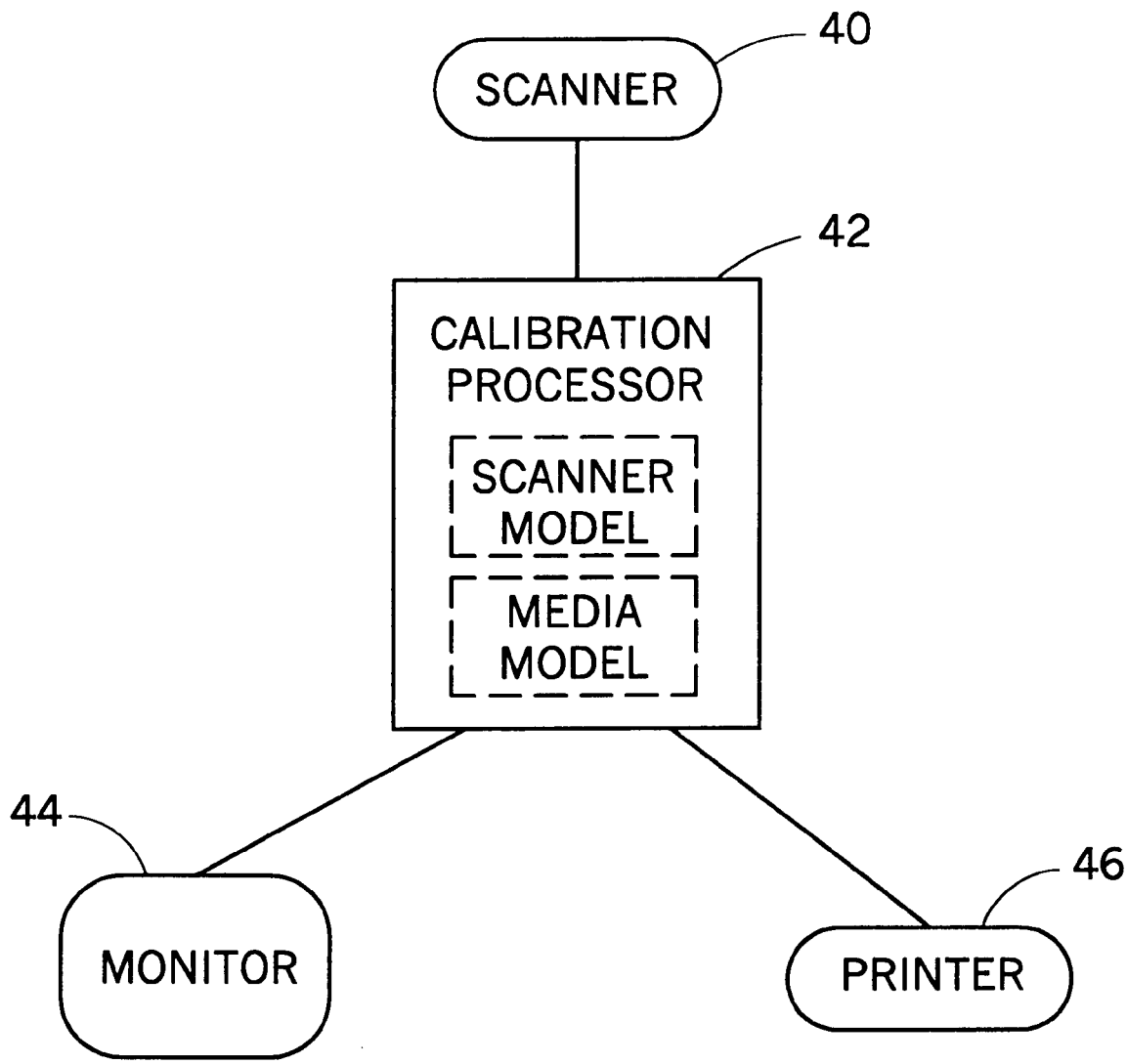
FIG. 3 is a block diagram of an imaging assembly including the invention.

Referring now to the drawings wherein the showings are included for purposes of illustrating preferred embodiments of the invention only and not for purposes of limiting same, the invention is applicable to an imaging system typically comprised of a conventionally well-known scanning device 40 (FIG. 3), calibrating processor 42, monitor 44 and printer 46 wherein the particular media or image, photograph, print, text or assembly thereof, can be scanned into the system through the scanner and then displayed in either the monitor or reprinted at the printer. The goal of any color management system for such an assembly is that the original media item will appear color consistent throughout the system.

As noted above, many possible devices are manufactured from different manufacturers to be used as different parts of the imaging system and color consistency is difficult to maintain without resort to a target for calibration purposes. The subject invention provides an improved system for estimating an appropriate calibration converter based upon a predetermined knowledge of the spectral response of the scanner, i.e., the scanner model, along with spectral characteristics of a particular media, i.e., the media model, inferred from representative spectrophotometric measurements.

It is a feature of the invention that the scanner signals resulting from the scan of a color sample are used along with the scanner's spectral response to determine the set of spectra that could result in the aforementioned signals. The spectrum of the color sample is then estimated by the intersection of this set with the set of spectra producible on the given medium. This estimated spectrum for the input color sample can be converted to a device-independent color space.

In layman's terms, the color conversion occurs because out of all physically feasible spectra, a given medium is capable of realizing only a select few. Thus, the additional information provided by the scanner measurements and the predetermination of the scanner behavior on a total set of reflectance or transmissive spectra detected, allows one to accurately estimate the spectral reflectance of the input sample. There is a linear relationship between the spectrum of an input color sample to the scanner and the scanner signals that are produced. [Although it is still within the scope of the present invention if a known non-linearity (such as gamma correction) is applied to the scanner signals]. So conversely, given a particular measured scanner signal, the linear relationship can identify an associated class $S_s$ of spectra that could have generated a particular scanner measurement.

On the other hand, a particular media being scanned will not generate the entire class of physically feasible spectra, but will generate a much smaller set $S_m$. Any spectrum, in the intersection between the respective sets of spectra will provide an acceptable estimate of the actual (reflectance/transmittance) spectrum which led to the particular measurement from the scanner for the particular medium involved.

Figure 2:
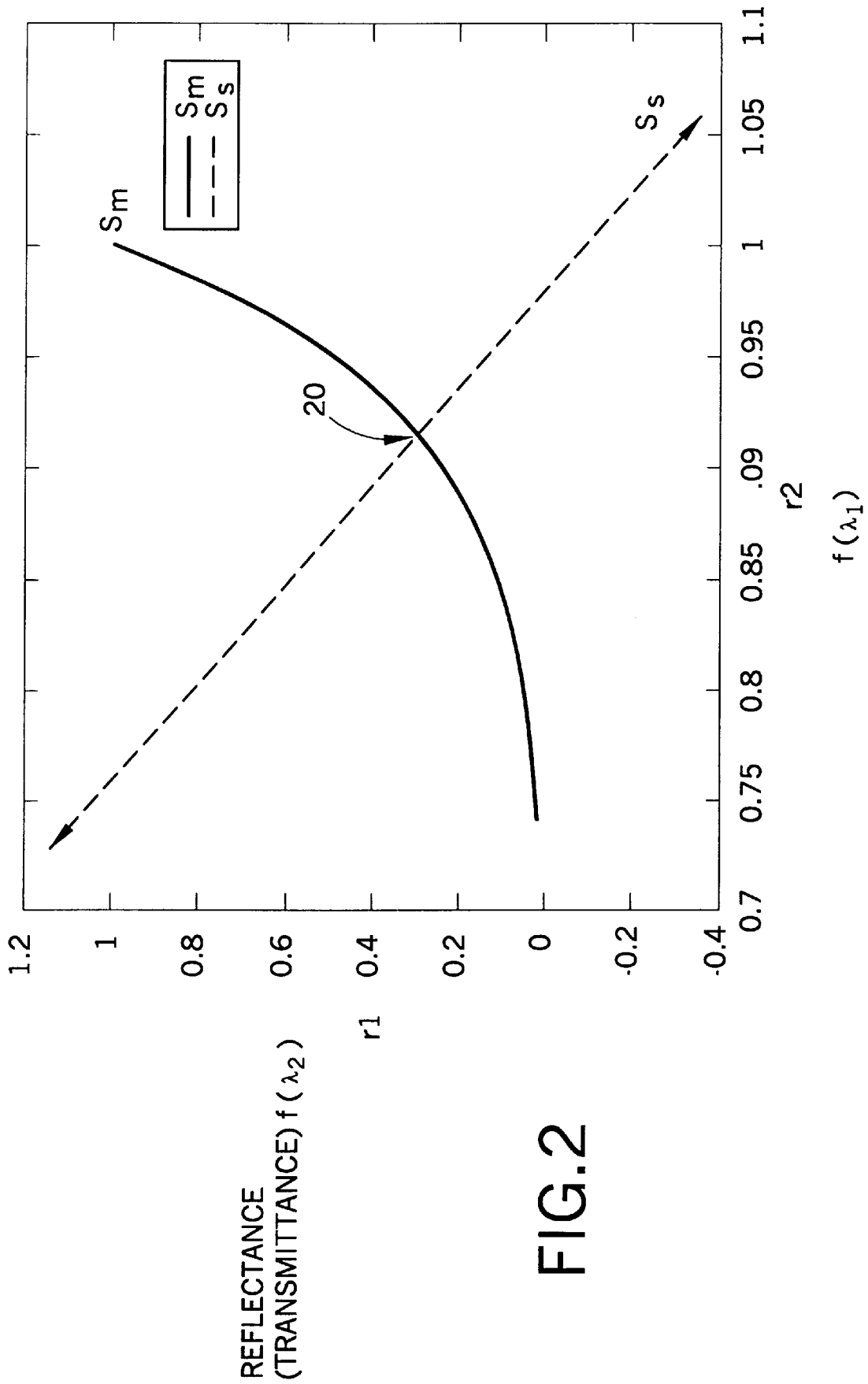
FIG. 2 graphically illustrates for a synthetic two dimensional example the set $S_m$ of all possible spectra that can be produced on the given the medium, the set $S_s$ of spectra that could result in the given scanner measurements, and the intersection of these sets.

FIG. 2 is a diagrammatic two dimensional illustration of the intersection between the set of reflectances or transmittances that could have led to a given scanner measurement, $S_s$, and the total possible reflectances provided from the given medium $S_m$ as a function of wavelengths. The intersection point 20 is an accurate calibration point for converting a particular scanner measurement, a device-dependent measurement, into a device-independent color space. The actual data and symbols shown therein will be more fully explained below.

Figure 1:
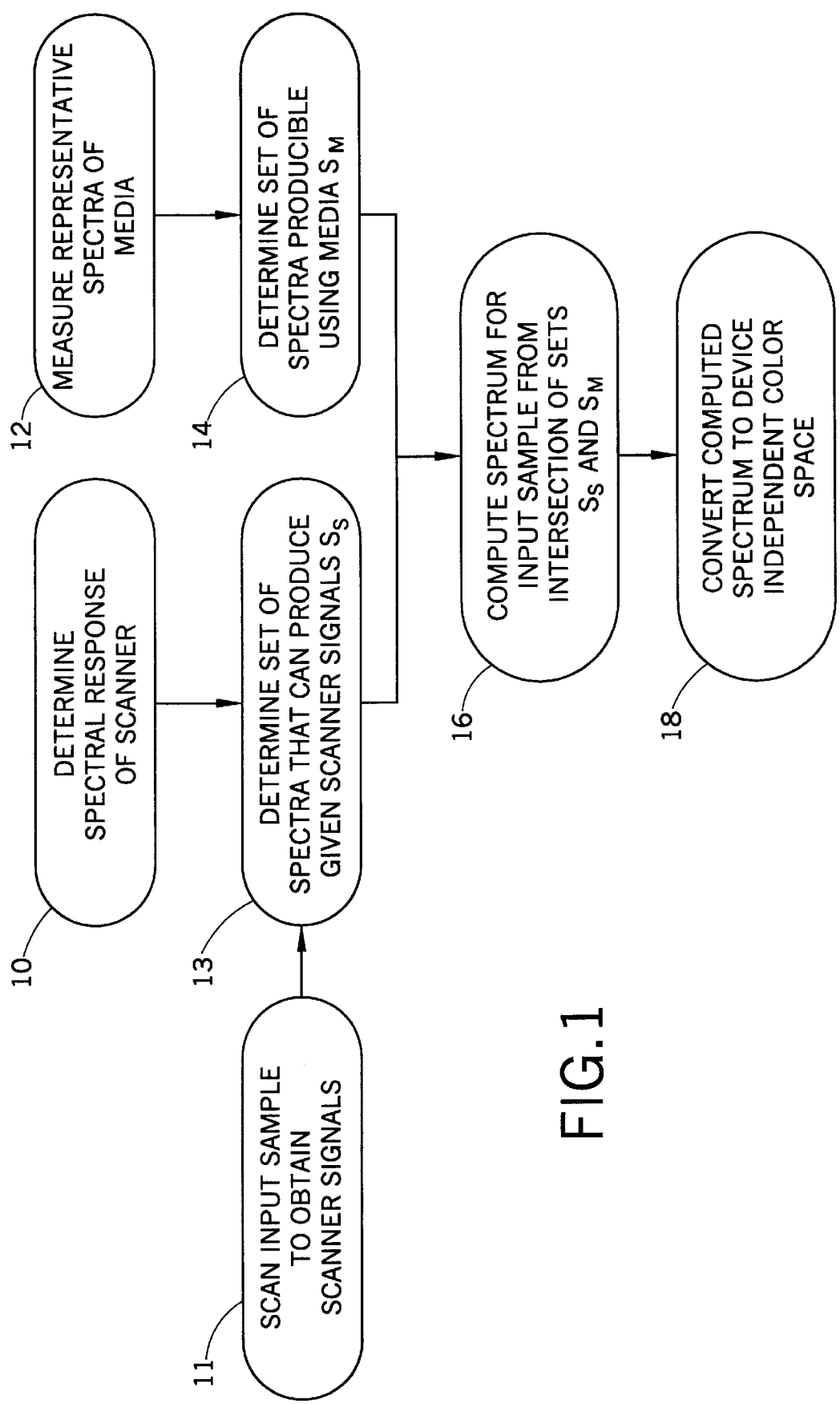
FIG. 1 is a flowchart of the processing steps practiced for calibrating a system according to the preferred embodiment of the present invention.

FIG. 1 comprises a flowchart of one embodiment of the subject invention.

The first step of the method comprises a determining 10 of the spectral response of the scanner 40 comprising an identification of a relationship between a spectrum of inputs to the scanner and the scanner measurements generated in response to the input spectrum. An input sample is scanned 11 to obtain a set of scanner measurement signals. The scanned signals are used along with the spectral response of the scanner to determine 13 the set of spectra that could result in the given scanner signals. This set of spectra $S_s$ (FIG. 2) comprises all possible input spectra that produce the given signals on the scanner.

Next a set of samples on the input medium representative of its spectral nature are measured on a spectrophotometer 12. From these measurements, the set of spectra producible on the given medium, $S_m$, is determined 14. A principal component analysis could be employed in this step as will be mathematically detailed more fully below.

The next step comprises determining a spectrum 16 in the intersection of the set of possible media spectra, $S_m$, and the set of input spectra, possible for the given scanner measurements, $S_s$. Lastly, the estimated spectrum is converted 18 to a device-independent color space.

It is further within the scope of this invention that instead of computing 16 the spectrum after scanning the sample, the invention can be used to generate a calibration look-up table (LUT) by precomputing the spectrum or device independent color for different scanner signal values. This LUT could then be used to directly transform scanner signals to spectrum or to device independent colors.

Figure 4:
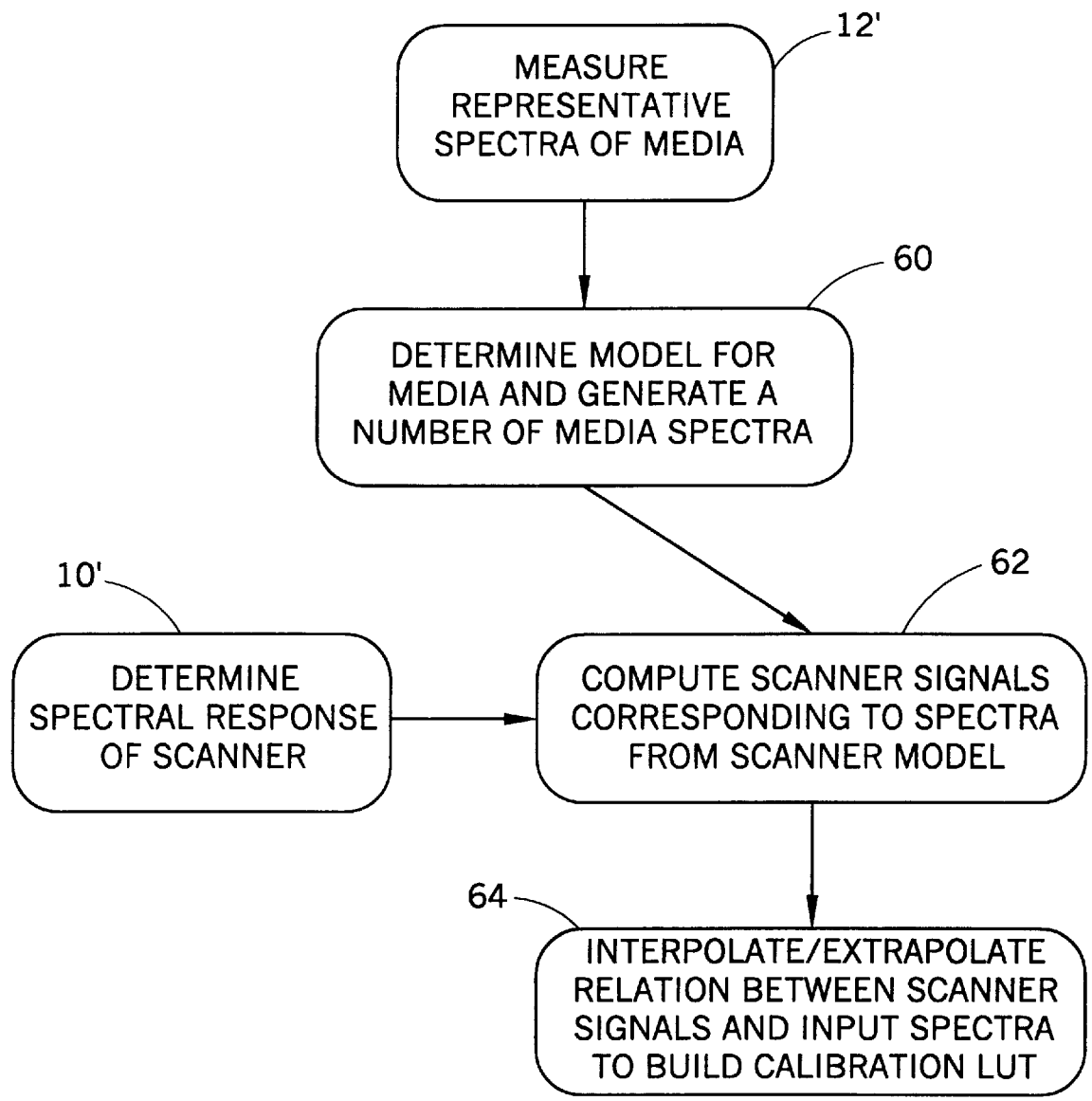
FIG. 4 is a flowchart of an alternate embodiment of the present invention.

An alternate embodiment of the invention is shown in FIG. 4, wherein the LUT is generated by interpolation without using the sets. The first step of the method comprises a determining 10' of the spectral response of the scanner 40 comprising an identification of a relationship between a spectrum of inputs to the scanner and the scanner measurements generated in response to the input spectrum. Next a set of samples on the input medium representative of its spectral nature are measured on a spectrophotometer 12'. From these measurements, the media model is derived 60. A principal component analysis could be employed in this step as will be mathematically detailed more fully below. Using the media model a number of media spectra are generated 60. Corresponding scanner signals are estimated 62 by using the scanner model. The resulting relation between scanner signals and input spectra is interpolated/extrapolated 64 to obtain a LUT from scanner signals to spectrum (or alternately colors in a device independent color space).

The subject method is advantageous in that it can be applied to scanners scanning reflective media or transmissive media.

The mathematical detailing of the subject invention is discussed below.

Through this description it will be assumed that color spectra are sampled at specified wavelengths $[\lambda_1, \lambda_2, \ldots \lambda_N]$, so that a spectrum $f(\lambda)$ can be represented by a vector $f=[f(\lambda_1), f(\lambda_2), \ldots f(\lambda_N)]$.

For most common scanners, the response of the scanner can be modeled fairly accurately by the equation $$t_s = M_s^T r \tag{1}$$

where $t_s$ is the vector of scanner measurements (RGB values typically), r is the reflectance of the scanned sample, and $M_s$ is a matrix whose $i^{th}$ column, $m_i$, is the spectral sensitivity of the $i^{th}$ scanner channel (including effects of the recording illuminant, filter transmittance and the detector sensitivity), and the superscript "T" denotes the matrix transpose operation.

Photographic prints and prints from contone printers use subtractive color reproduction. Subtractive reproduction can be viewed as the cascading of successive layers of transparent dyes on the reflecting paper where the concentration of the colorants in the different layers is varied to produce different colors. If the Bouguer-Beer law applies, the spectral reflectance of a print can be represented by $$r(\lambda) = r_p(\lambda) \exp\left(-\sum_{i=1}^{K} c_i d_i(\lambda)\right) \tag{2}$$

where $r_p(\lambda)$ is the spectral reflectance of the paper substrate, $\{d_i(\lambda)\}_{i=1}^{K}$ are the spectral densities of the color dyes, and $\{c_i\}_{i=1}^{K}$ are the corresponding concentrations. (Note that conventionally the logarithm to the base 10 is used in defining density, but for notational simplicity the natural logarithm is used here, the logarithm to any other base can also be used without impacting the application.) Typically, cyan, magenta, and yellow dyes are used in color photography so K=3. If pure tone prints are available the densities $\{d_i(\lambda)\}_{i=1}^{K}$ can be determined from those prints. If pure tone prints are not available (for instance, when a calibration target is not available) for the same photographic dyes as the image, these cannot be determined from direct measurements. However, note that $$-\ln\left(\frac{r(\lambda)}{r_p(\lambda)}\right) = \sum_{i=1}^{K} c_i d_i(\lambda)) \tag{3}$$

The left hand side represents paper-relative spectral densities. Thus if the above model holds well for a given medium, the paper relative spectral densities of a set of spectral measurements are linear combinations of the densities $\{d_i(\lambda)\}_{i=1}^{K}$. Therefore by performing principal components analysis of paper relative densities computed from a set of representative spectral measurements (including one of the white paper), we can determine a basis set for the linear span of $\{d_i(\lambda)\}_{i=1}^{K}$. [Note R. S. Berns and M. J. Shyu, "Colorimetric Characterization of a Desktop Drum Scanner Using a Spectral Model", Journal of Electronic Imaging 4(4), October 1995, pp. 360–372.] The set of spectra producible on the given medium can then be represented as $$S_m = \left\{ r = r_p \otimes \exp(-\sum_{i=1}^{K} c_i d_i) \right\} \quad (4)$$

where $\oplus$ represents the term by term multiplication operator for vectors, $r_p$ is the spectral reflectance of the paper substrate, $\{d_i\}_{i=1}^{K}$ are the dye densities (actual or those computed by the principal components analysis described above), and $\{c_i\}_{i=1}^{K}$ are the corresponding concentrations.

Note that spectral densities of virtual dyes suitable for representing a photographic medium can be computed by using similar principal components analysis on spectral reflectance measurements made from images printed on that medium and do not explicitly require a target.

The goal of scanner calibration is to provide a transformation from the scanner measurements to a device-independent color space (such as CIE XYZ space) or to spectral reflectance (from which tristimuli can be readily computed). Assume that the scanner spectral response has been determined and the medium has been characterized in terms of actual/virtual dyes determined through direct measurements or by the principal components analysis mentioned above. Now from the model of (1) we can infer that a set of scanner measurements $t_s$ could result from spectra in the set $$S_s = \{r \mid t_s = M_s^T r\} \quad (5)$$

Since spectra on the scanned media are already known to lie in the set $S_s$ and $S_m$ would provide a good estimate of the target reflectance. This is the idea behind model-based scanner calibration.

One hurdle remaining for model-based scanner calibration is a robust algorithm for determination of a spectrum in the intersection of $S_s$ and $S_m$, which is an instance of a set theoretic estimation problem. The most robust algorithms for set-theoretic estimation are variants of the method of projections onto convex sets (POCS), which require that the sets be closed-convex sets in a Hilbert space. However, these algorithms are not directly applicable to this problem because even though the set $S_s$ is a closed convex set in $R^N$, the set $S_m$ is generally not convex in $R^N$ (the exceptions to this statement include the block-dye assumption and other situations that are not of practical interest). Here we describe an alternate Hilbert space structure which convexities $S_m$ allowing us to use a generalized product space framework to solve this problem. [cf. Combettes, Generalized Convex Set Theoretic Image Recovery. In Proc. IEEE Intl. Conf. Image Proc., vol. II, pp.453–456, September 1996.]

If a Hilbert space $\Xi$ is defined over the field of real numbers by the set of vectors $$\Xi' = \{x \in R^N \mid x_i > 0\} \quad (6)$$

and the addition and scalar product operators, $\oplus$ and $°$, respectively, as $$x \oplus y = \exp(\ln(x) + \ln(y)) = x \otimes y \quad (7)$$

$$\alpha ° x = \exp(\alpha \ln(x)) = x^\alpha \quad (8)$$

$$\langle x, y \rangle' = \ln(x)^T \ln(y) \quad (9)$$

Then it can be readily verified that $(\Xi', \oplus, °)$ defines an Hilbert space with the inner product $\langle .,. \rangle'$, and the norm defined as $$\|x\|' = \sqrt{\langle x, x \rangle'} = \|\ln(x)\| \quad (10)$$

It can also be seen that the set $S_m$ is a closed convex set in the Hilbert space $(\Xi', \oplus, °)$. Since the set $S_s$ is not convex in $(\Xi', \oplus, °)$ the model based scanner calibration problem cannot be simply transferred into the Hilbert space $(\Xi', \oplus, °)$ to get a problem with closed convex constraints. However, a generalized product space framework can be used to solve the problem of finding a spectral reflectance in the intersection of $S_s$ and $S_m$.

Consider the product Hilbert space $\Omega = R^N = \times \Xi'$. It readily follows that $S = S_s \times S_m$ is a closed convex set in this product Hilbert space. Also the diagonal space $$D = \{(x,y) \in R^N \times \Xi' \mid x = y\} \quad (11)$$

is a closed convex set in $\Omega = R^N \times \Xi'$. Therefore the projections onto convex sets (POCS) algorithm can be used to determine a point in $S \cap D$. It can be readily seen that this procedure yields a point $(y,y) \in \Omega$ such that $y \in S_s \cap S_m$, and therefore provides an algorithm for solving the model based scanner calibration problem. Further mathematical details can be found in the Combettes' paper cited above.

The method of model based calibration outlined above can be used to precompute the spectrum (or device independent color values) corresponding to different values of scanner signals to obtain a LUT for the calibration of scanner signals to spectrum (or to a device independent color space).

In an alternate embodiment (FIG. 4), the media model is obtained 12' as described above and a number of spectra are generated by varying $\{c_i\}_{i=1}^{K}$ in equation (2). Corresponding scanner signals are then computed using the scanner model of equation (1). This establishes a set of scanner signal node points for which corresponding media spectra are available. Interpolation and extrapolation can then be used to extend this correspondence between scanner signals and input spectra to a complete LUT from scanner signals to input spectra.

The invention has been described with reference to the preferred embodiments. Alternatively, features appreciable by those of ordinary skill in this art, although not specifically detailed herein, are still intended to fall within the scope of the invention.

Having thus described the invention, I now claim:

1. A method of calibrating a scanner for an input sample of a selected medium without accessing a predetermined calibration target for the selected medium comprising steps of:

predetermining the spectral response of the scanner comprising the relationship between the spectrum of inputs to the scanner and the scanner measurements generated in response to these inputs;

measuring the selected medium in a spectrophotometer for acquiring a set of spectra representative of the spectral nature of the selected medium;

determining the set of spectra that could result in a given set of scanner measurements using the spectral response of the scanner;

estimating the spectrum of an input sample from its scanner measurements by computing a spectrum corresponding to the intersection of the set of producible spectra for the selected medium and the set of spectra that could result in the given scanner measurements; and converting the estimated spectrum to a device-independent color space.

2. The method as defined in claim 1 applied to scanners scanning reflective media.

3. The method as defined in claim 1 applied to scanners scanning transmissive media.

4. The method as defined in claim 1 wherein the determining of the set of producible spectra comprises performing principal components analysis of spectral densities relative to the unprinted media (paper/transparency) computed from the set of representative spectral measurements.

5. The method as defined in claim 1 wherein the set of producible spectra on the given medium and the set of spectra that result in a given set of scanner measurements are represented as closed convex sets.

6. The method as defined in claim 5 wherein the estimating comprises computing a spectrum in the intersection with an algorithm for projections onto convex sets.

7. An imaging apparatus comprising a calibrator for calibrating an apparatus output to an input sample of a selected medium without accessing a predetermined calibration target for the selected medium comprising:

a scanner for sensing an input and producing measurement signals governed by a spectrum of the input;

a memory for storing a set of spectra representative of a spectral nature of the selected medium, a medium model comprising a set of medium spectra possibly producible on the selected medium determined from the representative set of spectra, and a scanner model comprising a relationship between the spectrum of inputs to the scanner and the scanner measurements generated in response to these inputs; and, a processor for estimating a spectrum of the input sample by computing the spectrum as an intersection of the spectra predicated by the medium model and the scanner model and for converting the estimated spectrum to a device-independent color space.

8. The apparatus as defined in claim 7 wherein the scanner comprises means for scanning reflective media.

9. The apparatus as defined in claim 7 wherein the scanner comprises means for scanning transmissive media.

10. The apparatus as defined in claim 7 further including means for determining the set of medium spectra by performing principal components analysis of spectral densities relative to an unprinted media computed from the representative set of spectra.

11. The apparatus as defined in claim 7 further including means for determining the medium and the scanner model by representing the medium spectra and scanner spectra sets as closed convex sets.

12. The apparatus as defined in claim 11 wherein the processor includes means for computing the spectrum comprising the intersection with an algorithm for projections onto convex sets.

13. A calibrating processor for converting an input signal representative of an input sample of a selected medium to an output signal:

a detector for determining a response of a device generating the input signal comprising a relationship between a spectrum of inputs to the device and measurements generated in response to the spectrum of inputs;

a memory for storing a set of medium spectra producible on the selected medium, and a set of input signal spectra capable of producing given device based on the response of the device; and, a processor for estimating a spectrum of the input sample from the device measurements by computing the spectrum as an intersection of the set of producible medium spectra and the set of spectra capable of producing the device measurements.

14. The calibrating processor as defined in claim 13 wherein the device comprises means for scanning reflective media.

15. The calibration processor as defined in claim 13 wherein the device comprises means for scanning transmissive media.

16. The calibrating processor as defined in claim 13 further including means for determining a set of medium spectra representative of the selected medium by performing principal components analysis of spectral densities computed from the representative set of spectra.

17. The calibrating processor as defined in claim 13 further including means for determining the producible medium set of spectra and determining the set of input signal spectra by representing the sets as closed convex sets.

18. The calibrating processor as defined in claim 17 wherein the processor computes the spectrum by intersecting the sets with an algorithm for projections onto convex sets.

19. A method of calibrating a scanner to a spectrum or to a device independent color space for a selected medium comprising steps of:

predetermining a spectral response of the scanner wherein the response comprises the relationship between the spectrum of inputs to the scanner and the scanner measurements generated in response to these inputs;

measuring the selected medium in a spectrophotometer for acquiring a set of spectra representative of the spectral nature of the selected medium;

determining a model for the spectra on the selected medium based on the representative spectral measurements;

computing the spectrum or device independent color values corresponding to given scanner signals by combining the scanner model from the spectral response and the media model.

20. The method as defined in claim 19 wherein the computing comprises generating a set of scanner signal node points for which a corresponding set of media spectra are available.

21. The method as defined in claim 20 wherein the computing further comprises interpolating/extrapolating about said node points for generating a calibration look-up table.

* * * * *